(12) United States Patent
Swift

(10) Patent No.: US 9,090,309 B2
(45) Date of Patent: Jul. 28, 2015

(54) SPRING-LOADED RETENTION AND RELEASE MECHANISM FOR USE ON CLIPLESS BICYCLE PEDALS

(76) Inventor: Paul Swift, Kirkland, WA (US)

(*) Notice: Subject to any disclaimer, the term of this patent is extended or adjusted under 35 U.S.C. 154(b) by 63 days.

(21) Appl. No.: 13/200,686

(22) Filed: Sep. 28, 2011

(65) Prior Publication Data

US 2013/0074647 A1 Mar. 28, 2013

(51) Int. Cl.
*B62M 3/00* (2006.01)
*B62M 3/08* (2006.01)
*B62M 3/16* (2006.01)

(52) U.S. Cl.
CPC ............... *B62M 3/086* (2013.01); *B62M 3/16* (2013.01); *Y10T 74/217* (2015.01)

(58) Field of Classification Search
USPC .............. 74/594.4, 594.6; 280/11.3, 11.31, 280/11.33, 11.34; 36/64, 131
See application file for complete search history.

(56) References Cited

U.S. PATENT DOCUMENTS

| 5,497,680 | A  | * | 3/1996 | Nagano | ......................... | 74/594.6 |
| 7,073,409 | B2 | * | 7/2006 | Ho | ................................ | 74/594.6 |
| 7,503,133 | B2 | * | 3/2009 | Muraoka | ......................... | 36/131 |
| 2011/0048166 | A1 | * | 3/2011 | Lin | ................................ | 74/594.6 |

FOREIGN PATENT DOCUMENTS

| DE | 3414971 A1 | * | 10/1985 | ............... B62M 3/10 |
| EP | 360245 A2 | * | 3/1990 | ............... B62M 3/08 |

* cited by examiner

*Primary Examiner* — Vicky Johnson
(74) *Attorney, Agent, or Firm* — Thomas I. Rozsa

(57) ABSTRACT

A retention and release mechanism for use on clipless bicycle pedals employed to achieve a mechanical advantage in the retention and release of shoe clip adapters and toe clips and other adapters. A preferred embodiment of the mechanism fits within existing clipless pedals, thus replacing existing rear retainers, and comprises a means by which it is affixed to the clipless pedal, a cleat retaining formation, a spring actuator and a specialized rearward extending spar. The cleat retaining formation has a special surface which facilitates entering a clip adapter or toe clip into retention mode. Release mode is effectuated by pressure on the spar which then engages the spring actuator to open the cleat retaining formation. The mechanism may be used on any type of clipless pedal and with any type of cleat adapter.

11 Claims, 14 Drawing Sheets

SPRING-LOADED RETENTION AND RELEASE MECHANISM FOR USE ON CLIPLESS BICYCLE PEDALS

BACKGROUND OF THE INVENTION

1. Field of the Invention

This invention relates to bicycle pedals and in particular, to rear retention mechanisms that accommodate a variety of bicycle shoe cleats and street shoe adapters. Use of the invention provides a mechanical advantage to cyclists and allows cyclists using bicycle shoe cleats or street shoe adapters in conjunction with clipless bicycle pedal systems to quickly, and with very little energy, release the cleat or adapter from the bicycle pedal, in a manner not seen before in the prior art.

2. Description of the Prior Art

The ubiquitous use of bicycles for pleasure, business and sport has resulted in a blossoming of new technologies related to this industry. One of the areas of interest is improving the pedal of bicycles and the way the foot and the pedal interact for maximum power transfer and for comfort. The current preference in modern bicycle pedal design is an arrangement that locks the pedal onto either special cleats which are fastened to the base of the cyclist's shoes or to an adapter for shoes that do not have the special cleats. Known as clipless pedal/cleat designs, these are used by cyclists when a cyclist mounts the bicycle, places the shoe cleat onto the pedal and, pushing downwardly on the shoe, snaps the pedal/cleat combination together. The cyclist repeats the procedure with the other foot, creating a locked and stable connection between the cyclist's feet and the bicycle pedals. The popularity of the clipless pedal is so marked that they can be found on every type of bicycle including competition, street, mountain, messenger and stationary bicycles.

An additional factor to be considered is that manufacturers are aware of the popularity of the clipless pedal/cleat and, to capitalize on the market, have developed pedal/cleat combinations that are not compatible with other models. Manufacturers typically produce pedal designs that require the use of a particular shoe cleat that fits only their pedal cleats. Thus, cyclists are required to purchase both a particular manufacturer's pedals and the corresponding shoe cleats. If a cyclist uses a bike with a different pedal, the cyclist cannot engage the clipless pedal without first obtaining the corresponding cleat.

The removal of the cleat from the pedal is generally accomplished by releasing the cleat from a rear retainer that hooks into a groove on the rear face of the cleat or adapter. The release of the cleat generally requires a strong, sharp, lateral twisting of the heel outwardly and away from the body of the bicycle, and within the plane of the pedal face.

This causes problems because removing the cleat from the pedal in this manner requires strength, in that the cyclist's ankles must be strong enough to make the sharp twist strong enough to escape the hook and strong enough not to be damaged by the twisting. Additionally, if the cyclist is not successful in detaching the cleat the first time, the cyclist must repeat the sharp twisting motion of the ankle until the cleat is released, and the ankle must be able to withstand the multiple twists as well.

Additionally, for non-stationary bikes, there is the additional element that the cleat must be removed before the bike comes to a standstill. Since both feet of the cyclist are affixed to the pedals, there is no means for the cyclist to be supported if at least one foot is not released from the pedal when the bike comes to a stop. For less experienced cyclists and for cyclists who are new to the clipless pedal/cleat, the psychological element of urgency and possibly panic is added to the cyclist's concern about timely detaching at least one foot in time before the cyclist falls.

An option for cyclists who prefer the clipless pedal, but for whatever reason are not using a shoe with the corresponding cleat, is the use of a toe clip, which is a basket-like device which has a cleat which mates into the clipless pedal, as would a shoe with such a cleat, and retains the toe and front portion of a cyclist's foot in a basket. A toe clip allows a cyclist to remove a foot easily from the basket. However, the problem then remains as to how to remove the toe clip from the pedal. The same, sharp lateral twist in the plane of the pedal face is still required, and must now be done by hand. This can be a strenuous and ungainly activity. Bruised knuckles, broken nails, and scraped wrists are not uncommon results when trying to remove these toe clips, and even so, removal is not guaranteed and multiple attempts are generally required. This can be embarrassing for cycling and indoor-cycling students who just can't get their pedal cleats off of their pedals, and also embarrassing for cycling instructors and indoor-cycling class instructors who will appear incompetent and uncoordinated in front of their classes when trying to assist students in the removal of toe clips. Additionally, this method of removal requires quite a bit of upper body strength.

To aid in the release of the clipless cleat from a pedal, several manufacturers have developed "keys" or tools which facilitate the removal of the cleat. These tools generally simulate the motion required of the cyclist's ankle for removal, the sharp, lateral movement in the plane of the pedal face, and therefore require strength on the part of the user. Another significant limitation of these tools is that they are limited only for the use of removing toe clips, and not for the cleated shoe.

There is lacking in the prior art a device that can aid in the removal of both a toe clip and cleated shoe. What is also needed is a device that can work with any type of bicycle, indoor and outdoor. There is a need for a device that is not specific to any one manufacturer or model and can work with any type of clipless pedal. There is a significant need for a device that operates quickly and with minimal effort and without injuring the user. There is no known prior art that addresses all these limitations.

SUMMARY OF THE INVENTION

The present invention addresses all the limitations of the prior art in a spring-loaded retention and release mechanism for use on any style of bike and on any style pedal having clipless capabilities. The present invention works very well on some of the current models of clipless pedals, such as the clipless pedals produced by LOOK®. The present invention provides a mechanical advantage in the removal of a shoe cleat adapter or a toe clip from a clipless pedal and requires very little exertion on the part of the user and can work with a shoe cleat and with a toe clip.

The present invention contemplates a retention and release mechanism for use with clipless pedal adapters that is incorporated as a single unit including a main body with a first side and a second side, the first side of the main body having a cleat receptor and a pedal attachment means and the second side of the main body having a spar or beam projecting from the second side in a lateral manner in the direction of the rear of the bicycle.

The present invention replaces the standard rear receptor that generally comes with a clipless pedal. A standard rear retainer is removed from a clipless pedal and the present invention is inserted into that position and is affixed to the clipless pedal in the same manner that a standard rear retainer is affixed. A standard rear retainer is generally attached to the clipless pedal body by means of a bolt, which usually extends through both the primary body of the clipless pedal and through the rear retainer, and around which the rear retainer pivots. The rear retainer is also in tension communication with the body of the clipless pedal, which is generally in conjunction with the pivoting bolt. This tension communication generally takes the form of a tension spring device, which resists operation unless and until it bears a load, and utilizes a spring actuator, having at least one spring, but which usually utilizes two springs, wherein each spring coils about the pivot bolt in opposite helical directions, each spring has one end in communication with the body of the clipless pedal and the other end affixed to the rear retainer. The tension spring can take many forms including plate-like devices, clam-shell devices and the like. Additionally, where the tension springs affix to the rear retainer there is also located a tension adjustment for the cyclist to set the amount of tension according to the cyclist's preference. The present invention operates by being inserted in the vacancy of the removed rear retainer of a clipless pedal and being operationally affixed to the pivot bar and to the tension spring(s) of the clipless pedal in the same manner as the removed rear retainer. The present invention also has a tension adjustor so the cyclist may make further adjustments according to preference.

Insertion of the cleat adapter into a clipless pedal having the present invention retention and release mechanism is the same as with the prior art, in that the shoe cleat or toe clip is inserted into the front receptor and snapped into the rear receptor, with the present invention in place of the standard rear receptor. Removal of the shoe cleat or toe clip does not follow the prior art. There is no need for any sharp twisting movement of the ankle, instead, merely pressing on the spar lifts the rear receptor at the opposite end of the spar upward, thereby releasing the shoe adapter or toe clip. There need not be a lot of upward movement, only enough movement to sufficiently release the adapter. Pressing on the spar is usually done by hand and by the cyclist. In other words, the cyclist, having a shoe still attached to the pedal, can just reach down and press on the spar to release a shoe adapter. Additionally, anyone can press on the spar to help the cyclist. For the removal of toe clips, the same process is available, or the cyclist's foot can be removed first and then push on the spar to release the toe clip. The mechanical advantage provided by the spar means that very little upper body strength is required from the person attempting to release the shoe adapter or toe clip, particularly as compared to the prior art. Children and the elderly will experience no difficulty in releasing a shoe adapter or toe clip like they have in the prior art. Everyone using this device, those both with and without upper body strength, will be able to remove shoe adapters and toe clips with ease and grace. The preferred embodiment of the spar has grips along the spar to aid the user. If a cyclist has been sweating, or has hands that are moist from sweat from gloves and the like, the cyclist's hands won't slide off the spar, and instead, the cyclist will have a non-slip, frictional location on which to press down on the spar. This, too, is absent in the prior art, and is yet another advantage of the present invention.

The retention and release mechanism of the present invention is preferably a spring-loaded device. The default position of the present invention is in the retention mode. It is when force is exerted on the spar that the present invention enters the release mode.

The lateral spar is of a length sufficient to provide the least amount of effort on the part of the user and yet not interfere with the cyclist or with the pedal movement. The spar should not hit the ground at the end of the down-cycle or at the beginning of the up-cycle of the peddling process. The spar preferably has a grip to further aid and ease the release of the shoe adapter. The spar may have braces, preferably underneath the spar, to support and buttress the spar. The spar may be made of any material that is appropriate for rear adapter receptors.

The present invention operates by first being inserted in a clipless pedal, a double-sided clipless pedal and the like, as the rear retainer in the clipless pedal. A toe clip or shoe adapter, having already been inserted into the clipless pedal, is removed quickly and easily in the following manner. Downward pressure is exerted, usually by hand, on the back end of the pedal on the spar of the present invention rear retainer. The presence and length of the spar allows the user to easily overcome the resisting force of the tension spring actuator, using just a little downward pressure, thereby stretching the tension spring or springs, resulting in the cleat retainer lifting its clamp head off the back of the toe clip or shoe adapter. Prior to the exertion of a downward pressure on the spar, the tension spring(s) actuator had provided a force on the clamp head so that the clamp head could keep pressure on the rear retainer of a toe clip or shoe adapter to hold it securely in place. Downward pressure on the spar results in overcoming the resisting force of the spring(s) actuator and raising of the clamp head. Raising of the clamp head means that the toe clip or shoe adapter is available to be removed from the pedal. All of these actions occur simultaneously with the exertion of downward pressure on the spar, which means that as soon as someone pushes down on the spar, the toe clip or shoe adapter is removed. Additionally, the presence, length and location of the spar provide a further advantage to the clipless pedal overall, because it means that the present invention rear retainer and release mechanism requires far less force to release a toe clip or shoe adapter than that required by the prior art, because the present invention rear retainer and release mechanism not only provides an actual place for the hand to grab a hold of and press down on, but also has grips, both of which are unique in the industry, and because the present invention rear retainer and release mechanism creates a faster, easier, and elegant solution to the afore mentioned problems in the prior art.

It is an object of the present invention to provide a spring-loaded bicycle cleat retaining and releasing mechanism to provide a mechanical advantage in order to reduce the amount of force needed to cause the cleat retaining mechanism to move away from the retained bicycle cleat.

It is an additional object of the present invention to provide a cleat retaining and releasing mechanism that provides a cleat removal that does not require a sharp motion that is lateral and in or parallel to the plane of the pedal face.

It is an additional object of the present invention to provide a cleat retaining and releasing mechanism that provides a cleat removal that does not require a sharp, twisting motion on the part of a cyclist's ankle.

It is an additional object of the present invention to provide a cleat retaining and releasing mechanism that provides a cleat removal that does not put stress on a cyclist's ankles nor cause injury to the person during the removal process.

It is an additional object of the present invention to provide a cleat retaining and releasing mechanism that provides a cleat removal that requires very little force and does not stress the person removing the cleat.

It is an additional object of the present invention to provide a cleat retaining and releasing mechanism that provides a cleat removal that is very easy to use by persons who have a weak upper body, such as children, adolescents, young adults, elderly, and infirm persons.

It is an additional object of the present invention to provide a cleat retaining and releasing mechanism that provides an apparatus that replaces the rear retainer of any clipless pedal.

It is an additional object of the present invention to provide a cleat retaining and releasing mechanism that provides an apparatus that replaces both rear retainers on a double-sided pedal.

It is an additional object of the present invention to provide a cleat retaining and releasing mechanism that functions so as to allow two cleat retaining and releasing mechanisms to reside simultaneously on a double-sided pedal.

It is an additional object of the present invention to provide a cleat retaining and releasing mechanism that retains any type of cleat adapter, including those for toe clips and street shoes.

It is an additional object of the present invention to provide a cleat retaining and releasing mechanism for use with all types of bicycles including stationary bicycles, road type bicycles and mountain type bicycles and to accommodate other mountain bicycle cleats and road type bicycle cleats to provide a mechanical advantage in order to reduce the amount of force needed to cause the cleat retaining mechanism to move away from the retained bicycle cleat and thereby enable the bicycle cleat to be removed with less force than that required by prior art rear retainers to remove the clip.

It is also an object of the present invention to provide gripping enhancements onto the surface of the cleat retaining and releasing mechanism so that the use of a downward force on the releasing mechanism to help release the cleat retaining mechanism will be improved by providing a greater friction surface.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
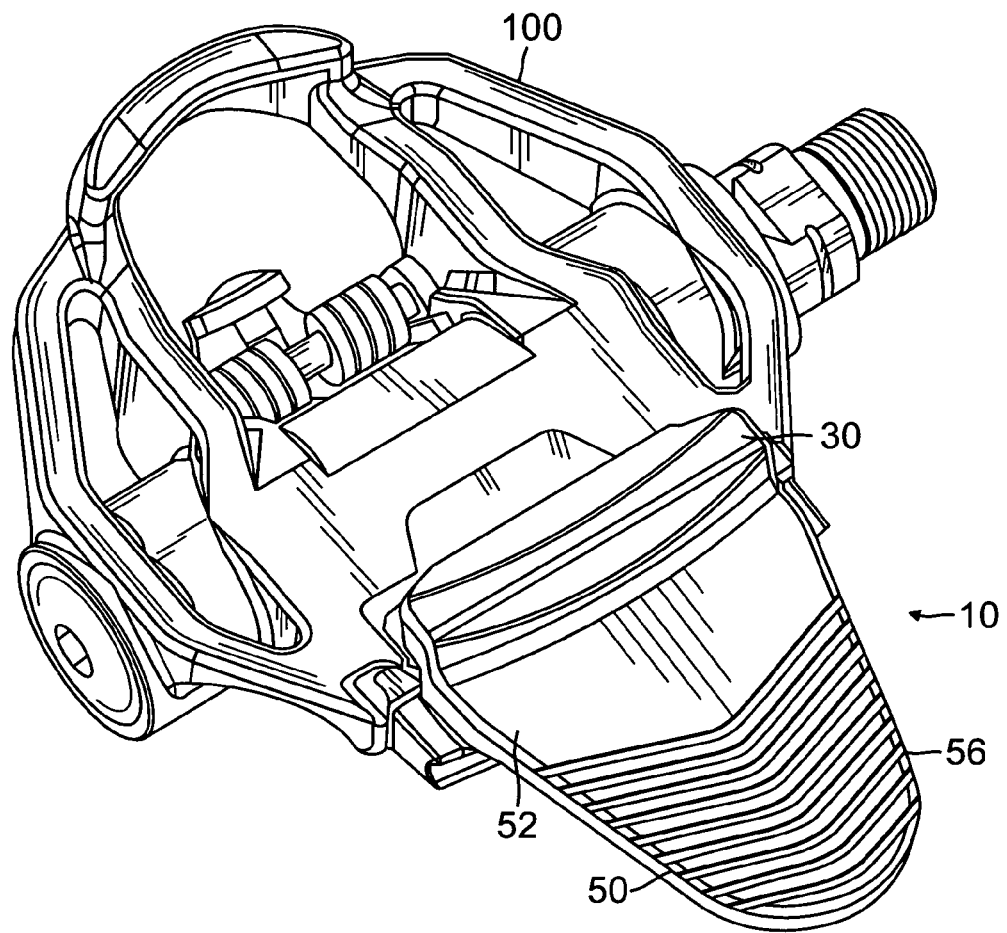
FIG. 1 is a top and side perspective view of a preferred embodiment of the retention and release mechanism of the present invention, illustrating the present invention in position on a double-sided clipless pedal structure.

There is shown in FIG. 1 the retention and release mechanism 10 of the present invention in its operative relationship with a double-sided clipless pedal 100. The figures presented herein illustrate a single retention and release mechanism on only one side of a double-sided clipless pedal. It should be noted that the present invention can work with a single-sided clipless pedal and can also be present on both sides of a double-sided clipless pedal. It can be seen that the present invention retention and release mechanism 10 has replaced the rear receptor of the clipless pedal 100. It can further be seen that the spar 50 has a plurality of grips 56 located on the top 52 of the spar 50. Only the top of the cleat retaining formation 30 can be seen.

Figure 2:
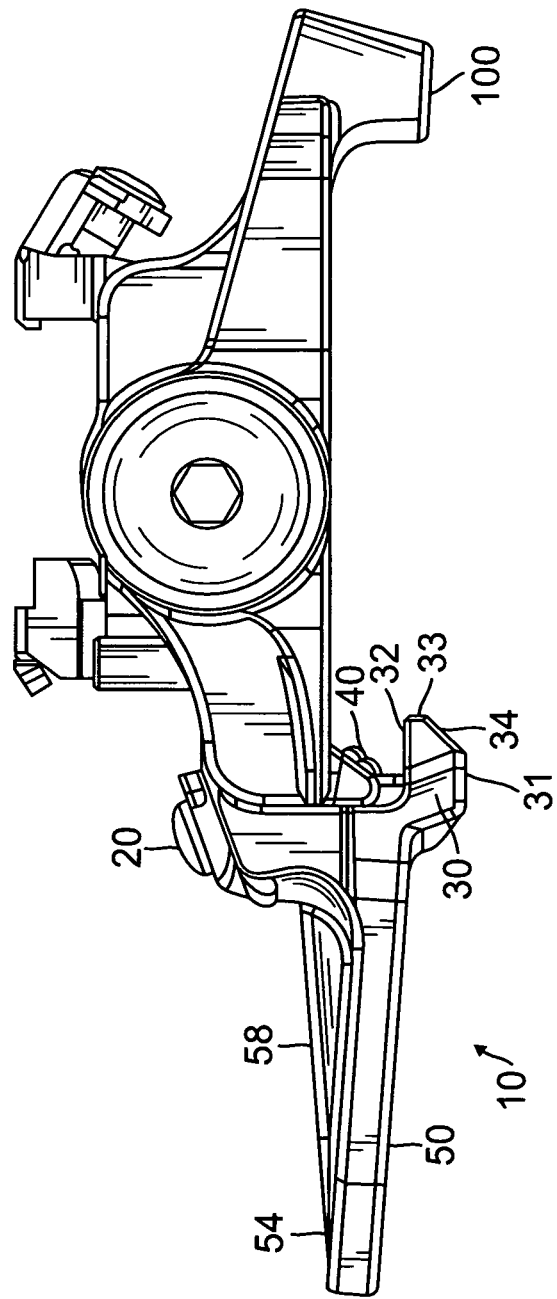
FIG. 2 is a side elevational view thereof.
Figure 3:
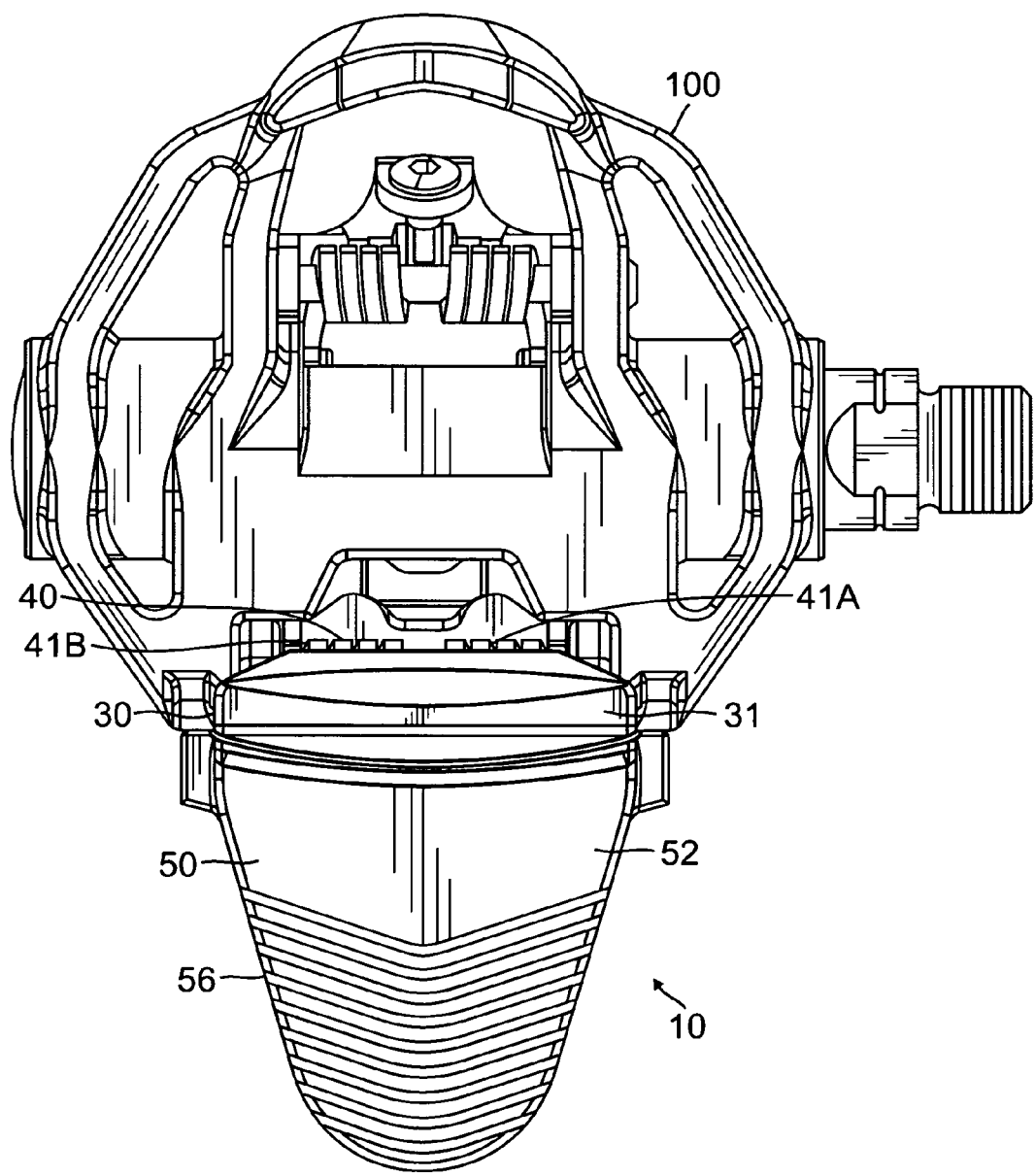
FIG. 3 is a top elevational view thereof.
Figure 4:
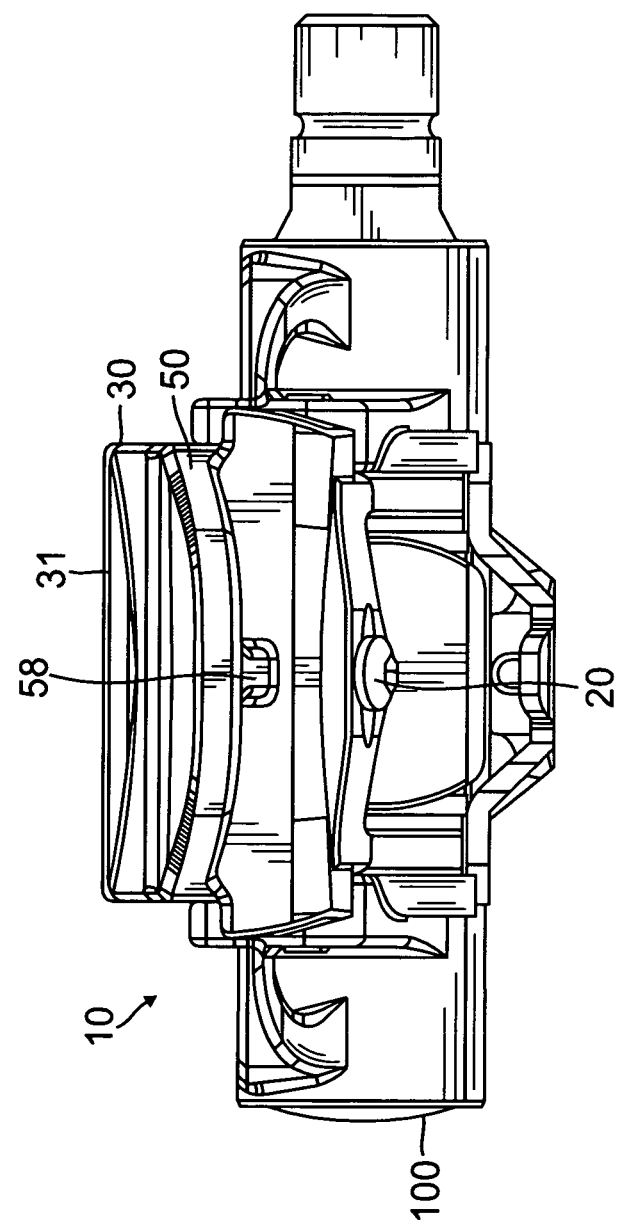
FIG. 4 is a rear elevational view thereof.

Illustrated in FIG. 2, FIG. 3 and FIG. 4, there can be seen the retention and release mechanism 10 operationally in place in a clipless pedal 100. The retention and release mechanism 10 is shown in the default position of retention mode. There can also be seen support 58 which is located on the bottom 54 of the spar 50. The present invention is functional with one support and also without any supports, but the preferred embodiment includes two supports 58A and 58B, as shown in FIG. 5B. Also seen in more detail is the cleat retaining mechanism 30 and the spring attachment and tension adjustment means 20 which affixes a tension spring 41 to the present invention retention and release mechanism 10 and which is also the tension adjustment for the tension spring 41. The spring attachment and tension adjustment means 20 is selected from the group consisting of screw and a bolt. The spring adjustment and tension adjustment means is used with clipless pedals. The cleat retaining mechanism 30 has a generally curved appearance, which arcs back towards the heel of a. cyclist's foot, but may be a series of angled planar surfaces, or a combination of both curved and planar surfaces. The underside 32 and the top surface 31 of the cleat retaining mechanism 30 are joined together by a clamp head 33. The clamp head 33 releasably secures the rear retainer 220 of a cleat adapter 210, shown in FIG. 9, through the application of downward pressure of the clamp head 33 on the rear retainer 220. The downward pressure is the pressure caused by the spring actuator, not shown.

There is also a receding surface 34 located preferably immediately above the clamp head 33. This receding surface 34 allows the clamp head 33 to engage and put pressure on the lower surface 221 the rear retainer 220 of a cleat adapter 210 and allow the top surface 31 of the cleat retaining mechanism 30 to clear the upper surface 222 of the rear retainer 220. See FIG. 9.

Referring to FIGS. 2 and 3, there is also illustrated the spring actuator 40, which is a generally at least one tight tension spring 41 so as to secure the cleat adapter 210 of a shoe or toe clip 200. The downward pressure exerted by the spring actuator 40, which has the spring 41 situated so as to resist stretching, bending or deforming unless a load is applied, allows the clamp head 33 to apply downward pressure on the lower surface 221 of a rear retainer 220 of a cleat adapter 210.

Referring to FIGS. 1, 3, 6, 9 and 10, grips 56, 356 are preferably present on the top 52, 352 of the spar 50, 350. These grips 56, 356 provide a better handhold for a cyclist, because generally when a cyclist is ready to disengage from a bicycle, the cyclist has been exercising and experiencing a great deal of exertion and the grips 56, 356 provide a little bit of friction for fingers and hands that are moist from perspiration.

Figure 5A:
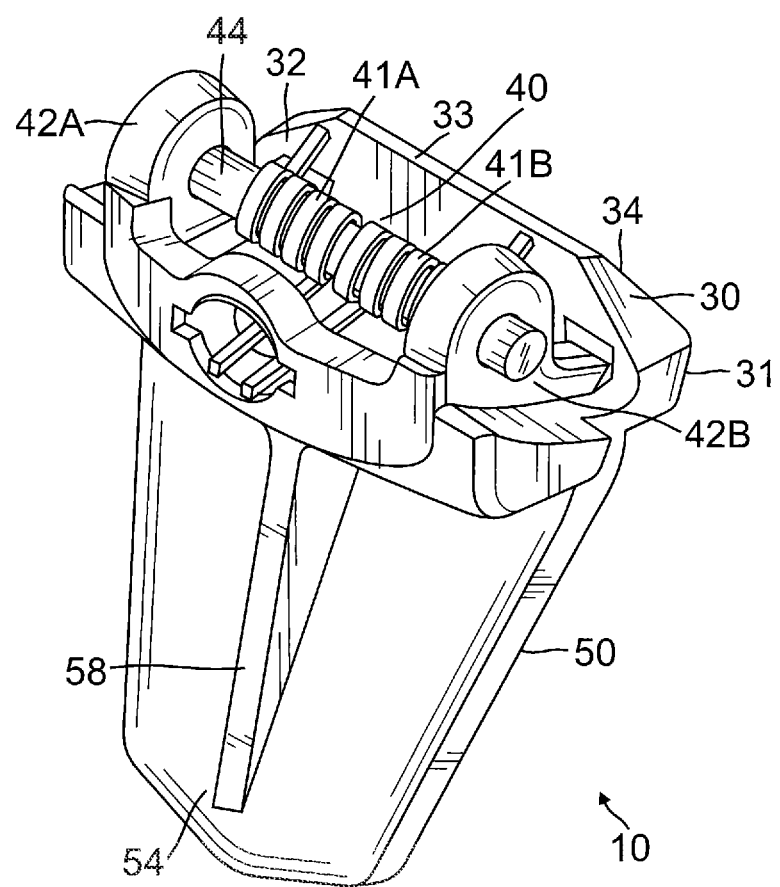
FIG. 5A is a bottom perspective view of a preferred embodiment of the retention and release mechanism of the present invention, wherein one under support is present.
Figure 5B:
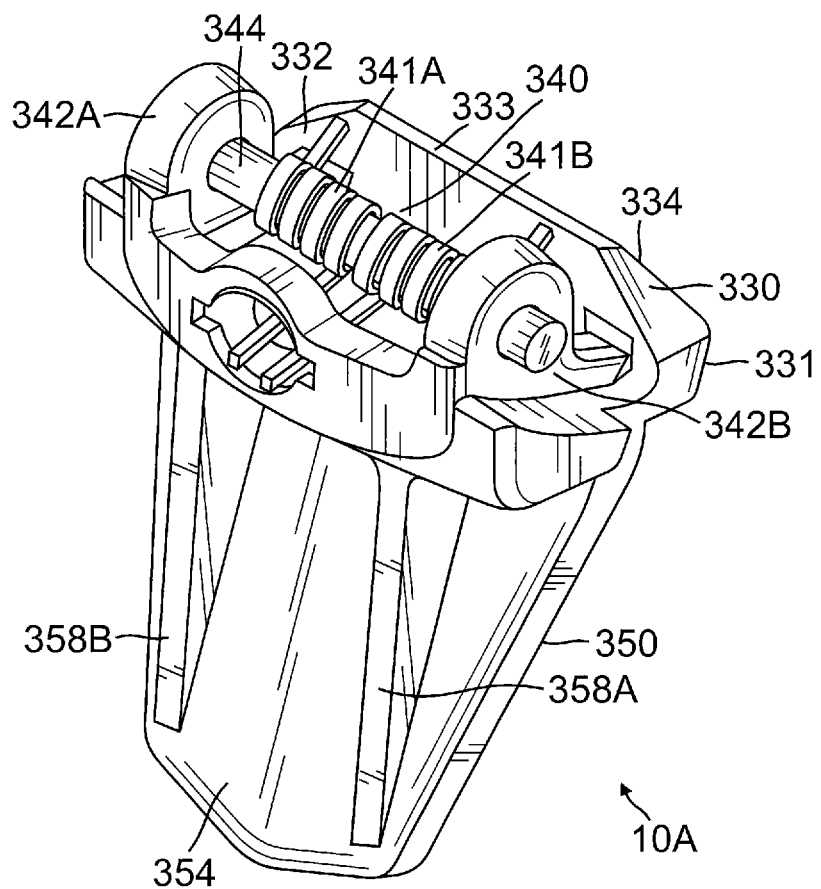
FIG. 5B is a bottom perspective view of a first alternate embodiment of the retention and release mechanism of the present invention, wherein two under supports are present.
Figure 5C:
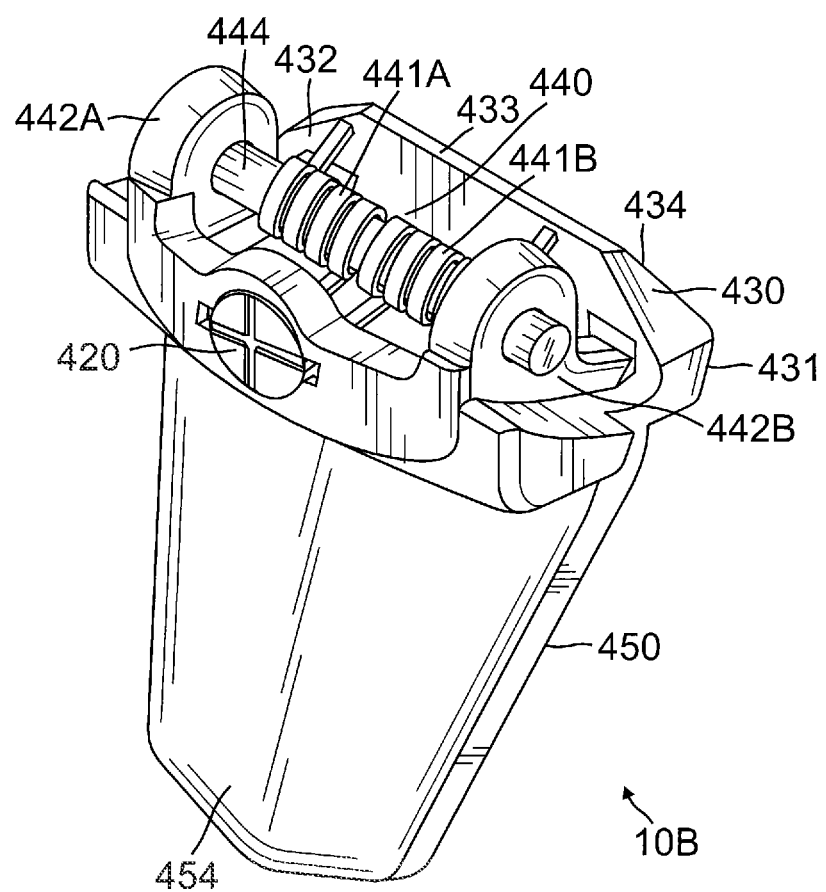
FIG. 5C is a bottom perspective view of a second alternate embodiment of the retention and release mechanism of the present invention, wherein there are no under supports present.

Illustrated in FIG. 5A, FIG. 5B, FIG. 5C, FIG. 6, FIG. 7 and FIG. 8, there is shown the present invention without a clipless pedal 100. FIGS. 5A, 5B, and 5C illustrate the present invention having identical parts among the preferred embodiment 10, the first alternate embodiment 10A and the second alternate embodiment 10B, with the exception of the number of supports under the spar 50, 350, 450. FIG. 5A shows the present invention 10 with one support 58, FIG. 5B shows the first alternate embodiment 10A with two supports 358A, 358 B, and FIG. 5C illustrates the second alternate embodiment 10B with no supports. Additionally, there is shown the spring attachment and tension adjustment mechanism 20, 320, 420. The underside 32, 332, 432 of the cleat retaining mechanism 30, 330, 430 clamp head 33, 333, 433 the receding surface 34, 334, 434 and the top surface 31, 331, 431 of the cleat retaining mechanism are also illustrated. The spring actuator 40 is shown generally in FIG. 2 and FIG. 3, and the details of the spring actuator 40, 340, 440 are shown in detail in FIG. 5A, FIG. 5B, and FIG. 5C comprising the parts of two fixed pivots 42A, 42B, 342A, 342B, 442A, 442B, a pivot bolt 44, 344, 444, and at least one tension spring 41, 341, 441 and is preferably with two, tension springs 41A, 41B, 341A, 341B, 441A, 441B. The pivoting bolt 44, 344, 444 is retained between fixed pivots 42A, 42B, 342A, 342B, 442A, 442B and a tension spring unit 41A, 41B, and which preferably has two tension springs 41A, 41B, 341A, 341B, 441A, 441B that are retained on pivot bolt 44, 344, 444. The spring actuator 40, 340, 440 may have two tension springs 41A and 41B, 341A and 341B, 441A and 441B coiled about the pivoting bolt 44, 344, 444 each having one end of its coil in the tension adjustment means 20, 320, 420 and the other end of its coil resting against the body of the clipless pedal in a manner such that the spring actuator 40, 340, 440 is resisting releasing the clamp head 33, 333, 433. There should be at least one fixed pivot, and the preferred embodiment of the present invention incorporates two parallel spaced apart fixed pivots 42A, 42B, 342A, 342B, 442A, 442B. Additionally, the pivot bolt 44, 344, 444 extends through each of the fixed pivots 42A, 42B, 342A, 342B, 442A, 442B such that it resides in a corresponding opening in the clipless pedal 100 to further affix the present invention cleat retention and release mechanism to the clipless pedal 100.

The remaining figures discuss the invention in terms of the first alternate embodiment 10A, however, the discussions apply to all the embodiments 10, 10A, and 10B of the present invention and are within scope thereof.

Figure 6:
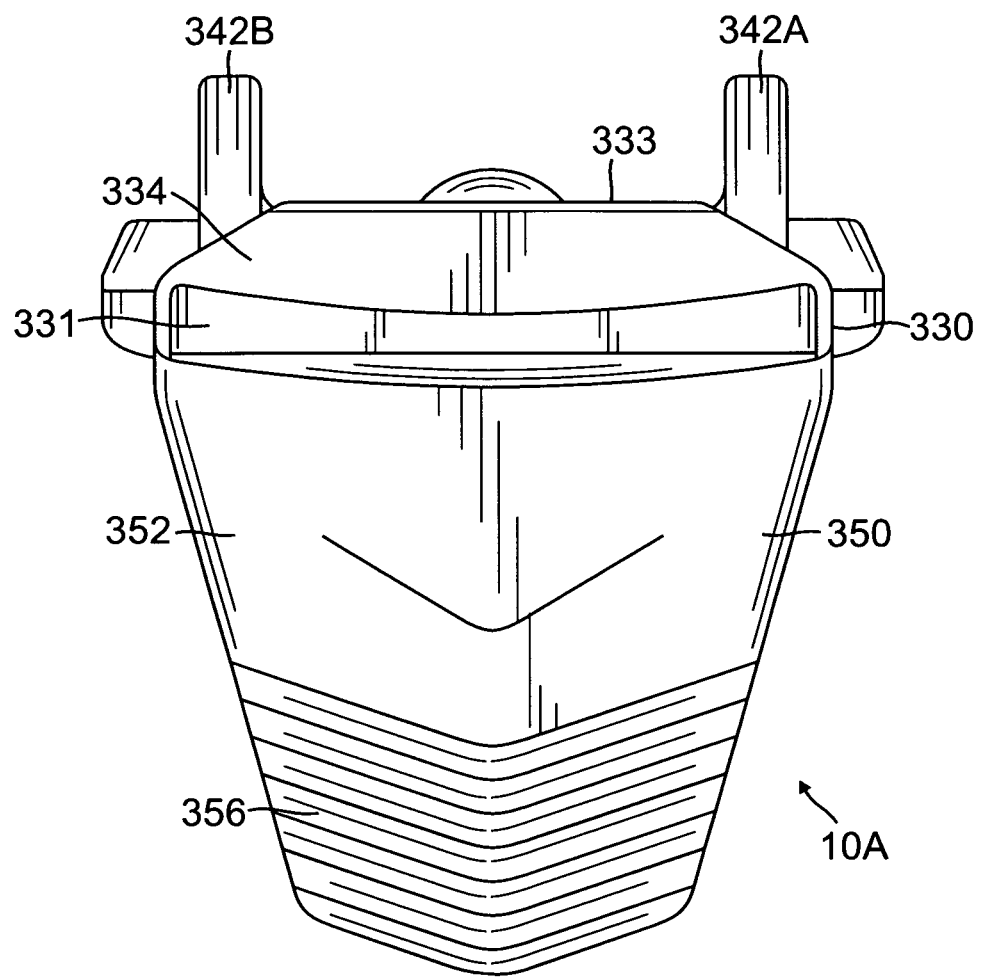
FIG. 6 is a top elevational view thereof.

The top of the first alternate embodiment of the retention and release mechanism 10A is highlighted in FIG. 6, and clearly illustrates the top 352 of the spar 350 and the plurality of grips 356. There can also be seen that the top 331 of the cleat retaining mechanism 330 flows into the receding surface 334, which flows into the clamp head 333. There are also two fixed pivots 342A, 342B. It is preferable that the fixed pivots 342A, 342B are located in front of the clamp head 333. This preference has at least two advantages, the first being that it allows the least amount of force to be applied to release a cleat adapter 210, shown in FIGS. 9 through 12, and the second that it allows the present invention retention and release mechanism 10 to fit into existing clipless pedals 100.

Figure 7:
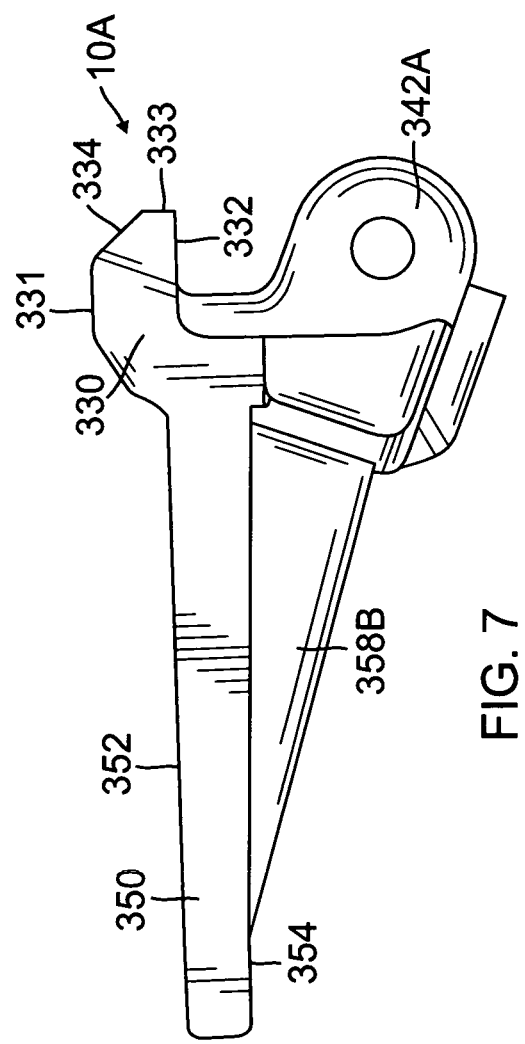
FIG. 7 is a side elevational view thereof.
Figure 8:
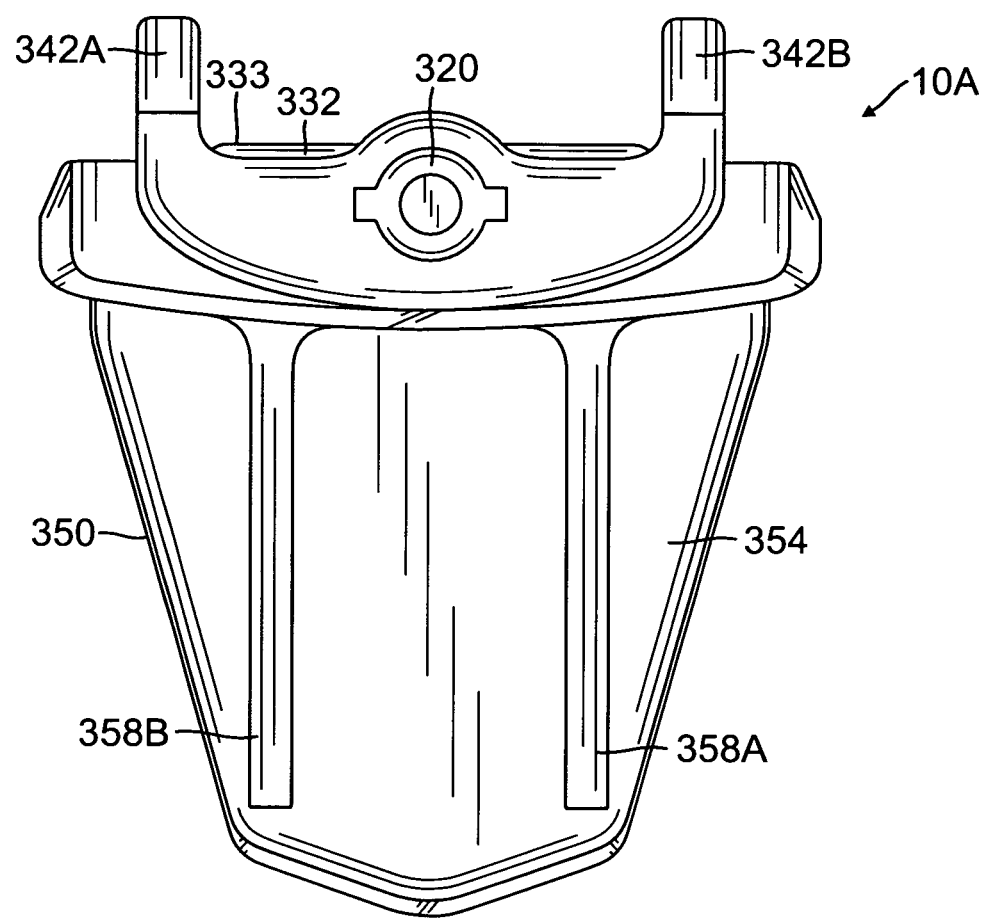
FIG. 8 is a bottom elevational view thereof.

The right side of the first alternate embodiment of the retention and release mechanism 10A is illustrated in FIG. 7, the left side of the preferred embodiment of the retention and release mechanism 10 previously illustrated in FIG. 2. The bottom of the first alternate embodiment of the retention and release mechanism 10A is illustrated in FIG. 8. In FIG. 7, there is shown the spar 350 having a top surface 352 and a bottom surface 354 and the profile of the supports 358A and 358B on the bottom 354 of the spar 350. One of the fixed pivots 342A is shown therein. The cleat retaining mechanism 330 is clearly seen having a top surface 331, a bottom surface 332, a receding surface 334 located on or near the top surface 331 and a clamp head 333. The bottom surface 354 of the spar 350, as well as the supports 358A and 358B, are highlighted in FIG. 8. There can also be seen the spring attachment and tension adjustment means 320 and two fixed pivots 342A, 342B. A glimpse of the underside 332 of the cleat retaining formation 330 and the clamp head 333 can also be seen.

Figure 9:
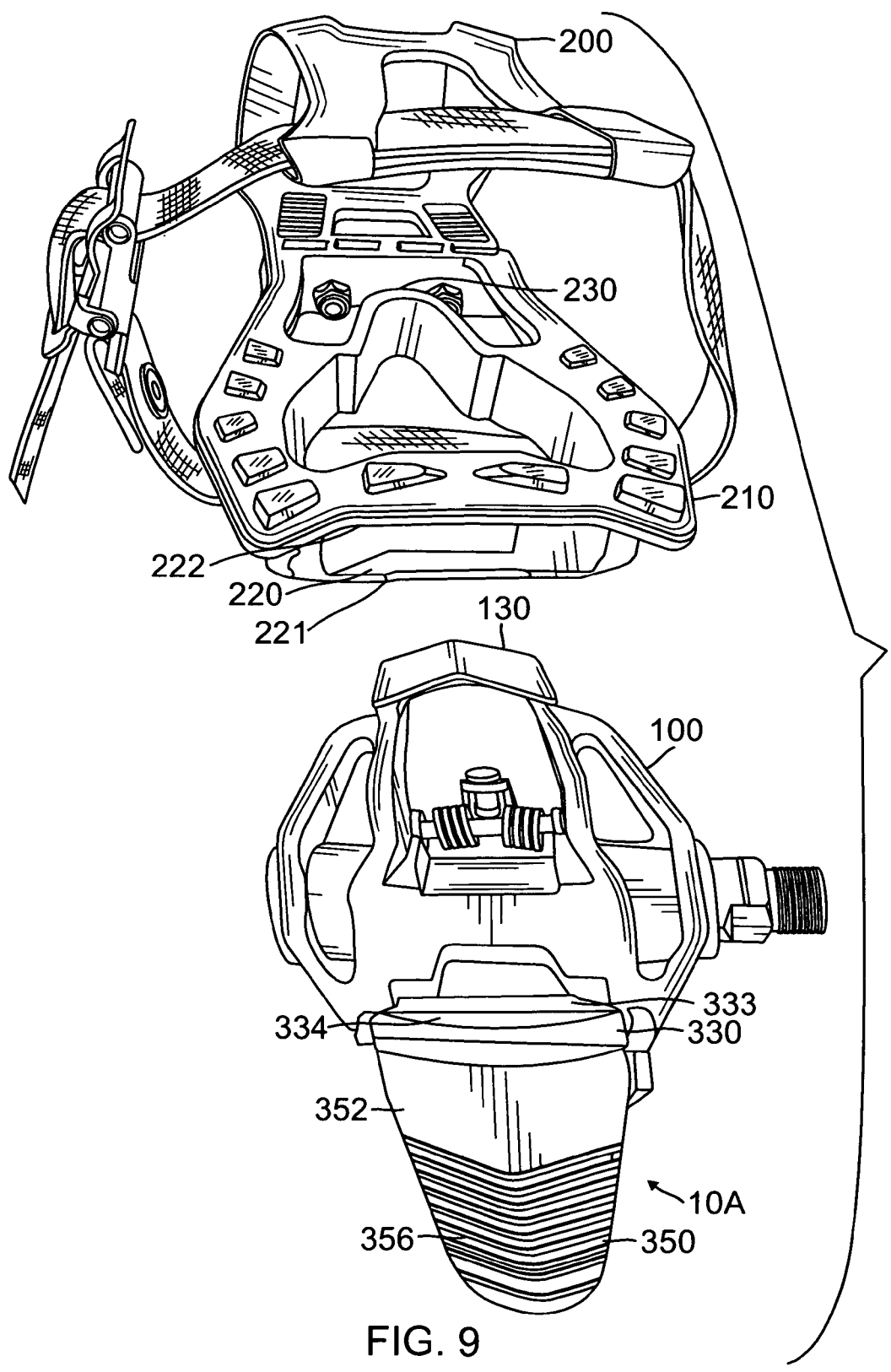
FIG. 9 is an exploded rear and top view of a toe clip adapter and a preferred embodiment of the present invention in position on a double-sided clipless pedal structure, the toe clip adapter about to be releasably retained by the clipless pedal structure.
Figure 10:
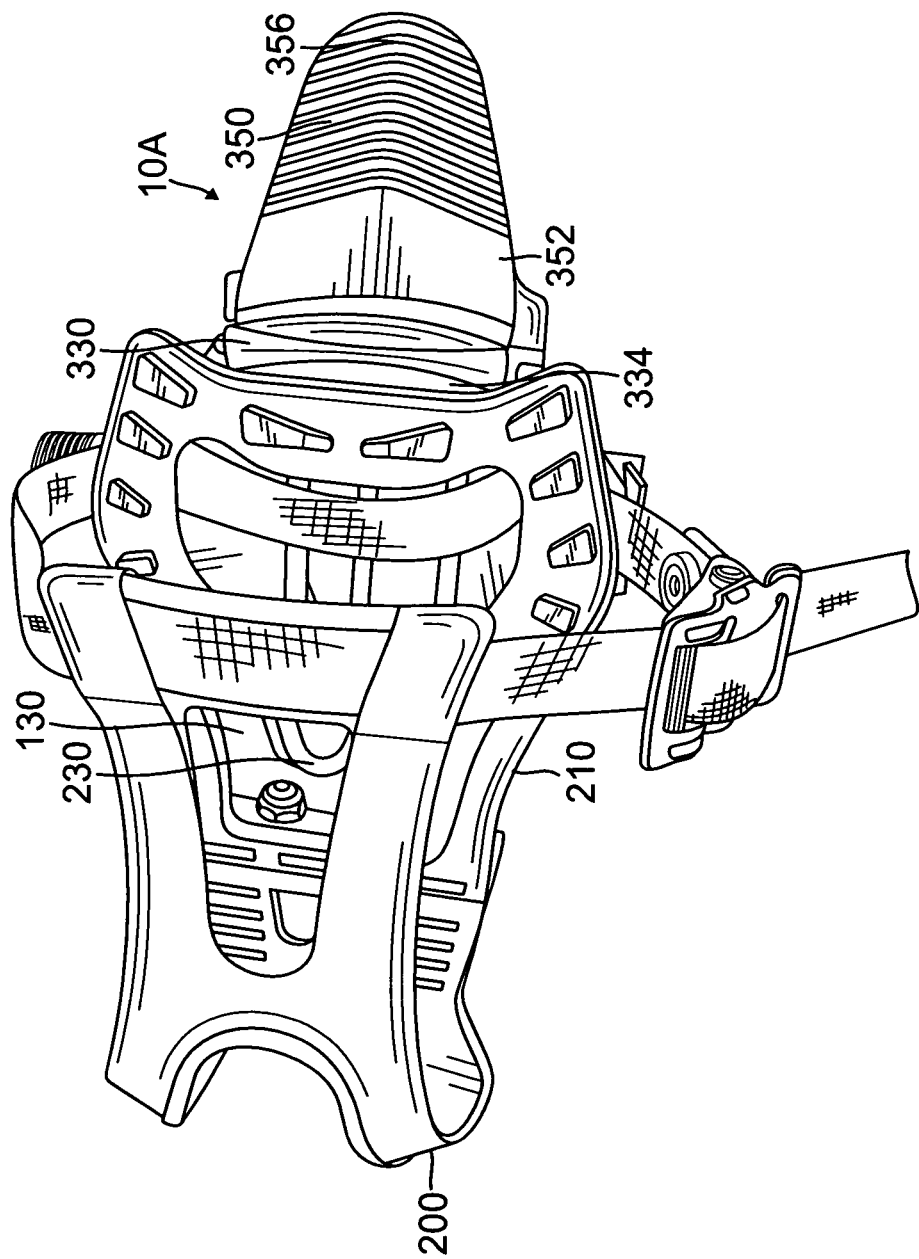
FIG. 10 is a perspective view of the top of a toe clip adapter releasably retained by the double-sided clipless pedal structure, the double-sided clipless pedal structure having a preferred embodiment of the retention and release mechanism in operational position thereon.
Figure 11:
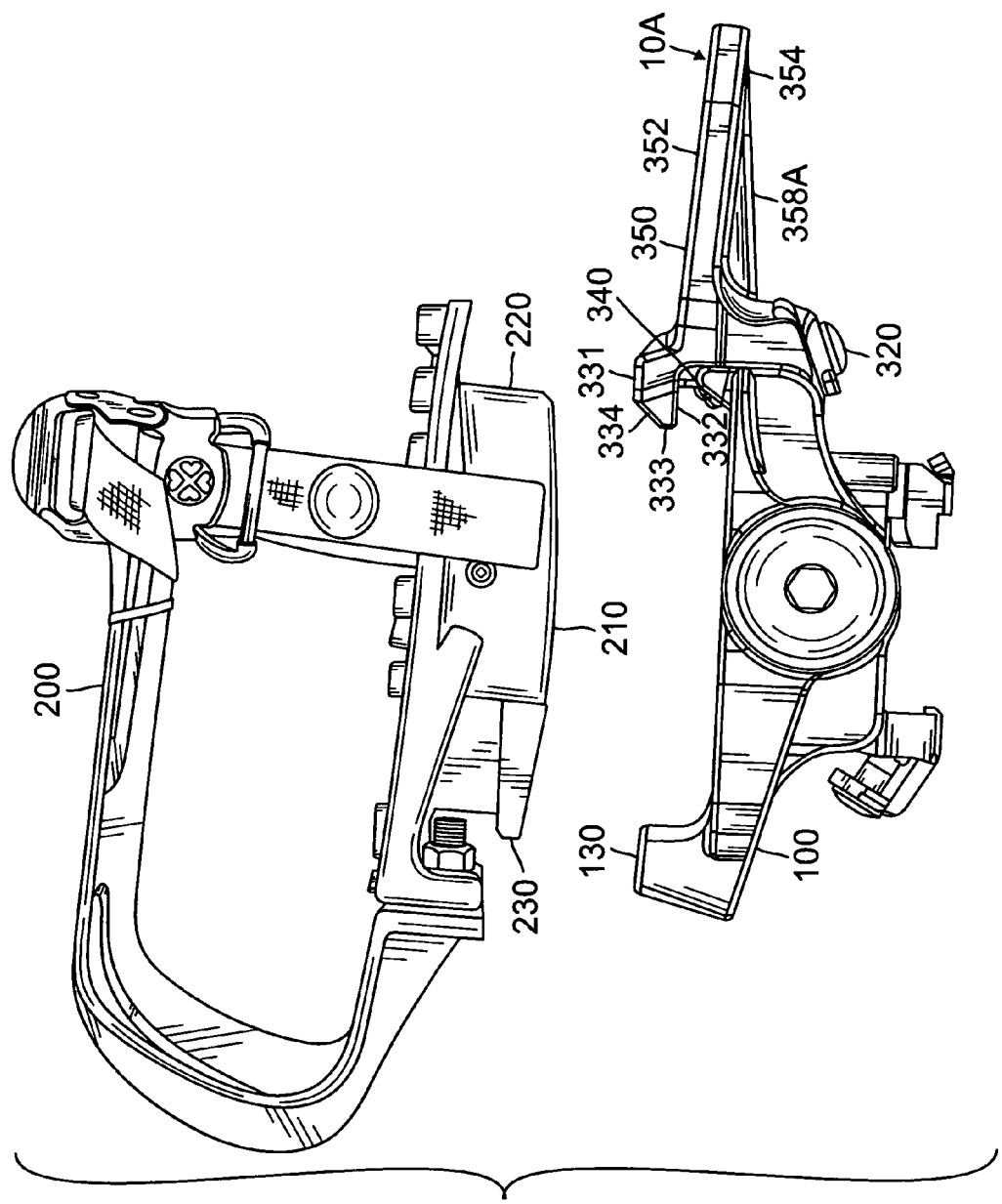
FIG. 11 is an exploded side view of a toe clip adapter about to be releasably retained on a double-sided clipless pedal structure, the double-sided clipless pedal structure having a preferred embodiment of the retention and release mechanism in operational position thereon.
Figure 12:
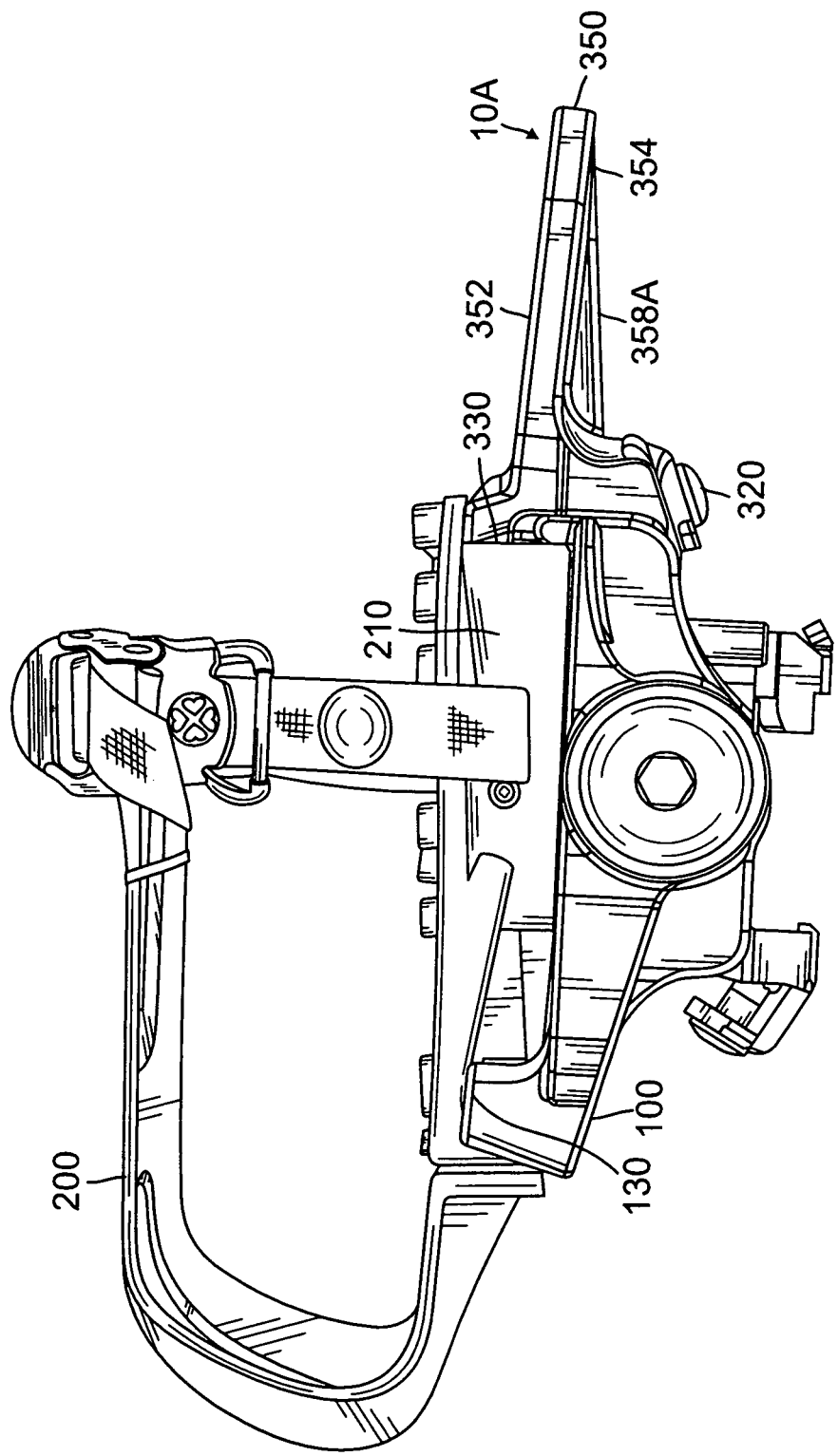
FIG. 12 is a side plan view at a slight perspective of a toe clip adapter releaseably retained by the double-sided clipless pedal structure, the double-sided clipless pedal structure having a preferred embodiment of the retention and release mechanism in operational position thereon.

Referring now to FIG. 9, FIG. 10, FIG. 11 and FIG. 12, there is illustrated the first alternate embodiment of the present invention retention and release mechanism 10A in operative communication with a clipless pedal 100 to retain and release a cleat adapter 210 of a toe clip 200. The use of a toe clip 200 in the figures is for illustration purposes only and not intended to limit the present invention for the use with these articles only. The present invention works equally well with a shoe adapter and it is intended to be within the contemplation of this invention that the present invention may work with any type of clipless pedal and with any type of cleat adapter. FIG. 9 illustrates a toe clip 200 that is not engaged with the clipless pedal 100 and is either about to be retained by the present invention 10 on the clipless pedal 100 or has just been released by the present invention from the clipless pedal 100. FIG. 10 illustrates a toe clip 200 that is engaged with a clipless pedal 100 and is being retained thereon by the present invention retention and release mechanism 10A. The clamp head 333 of the retention and release mechanism 10A will engage the toe clip 200 by entering the space between the upper surface 222 and the lower surface 221 of the rear retainer 220 of the toe clip 200. This is performed by first engaging the front retainer 230 of the toe clip 200 with the front cleat retainer 130 of the clipless pedal 100, then putting pressure on the heel of the toe clip 200 so that the rear retainer 220 of the toe clip 200 slides down the receding surface 334 of the present invention, which acts to put pressure on the spring actuator 340 so that the rear retainer 220 can snap in place under the clamp head 333, which will then hold the toe clip 200 in place. Release of the toe clip 200 is performed by applying downward pressure on the spar 350 of the retention and release mechanism 10A. The downward pressure on the spar 350 puts pressure on the spring actuator 340 to stretch and thereby raise the clamp head 333. Raising of the clamp head 333 releases the pressure of the retention and release mechanism 10A exerted on the lower surface 221 of the rear retainer 220 of the toe clip 200. Once that pressure is removed from the rear retainer 220, the toe clip 200 is free to be removed.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A retention and release apparatus for use on a clipless bicycle pedal, the tension and release apparatus comprising:
   a. a cleat retaining mechanism including a clamp head, a top which extends to a receding surface set at a downward angle toward the clamp head, the cleat retaining mechanism further including a pair of spaced apart parallel fixed pivot locations having parallel openings to receive a spring actuator bolt around which is wound a tension spring which produces a spring retaining force and by which the cleat retaining mechanism is affixed to the clipless pedal, the cleat retaining mechanism also including a spring attachment and tension adjustment means; and
   b. an elongated spar integrally affixed to a rear of the cleat retaining mechanism, the elongated spar having an upper surface further comprising grip members on the upper surface, the elongated spar extending away from the clamp head by a given distance so that a downward force on the spar will provide a mechanical advantage to overcome the spring retaining force from the tension spring, and cause the clamp head to move away from a cleat retaining member and a bicycle cleat retained by the cleat retaining mechanism, thereby releasing the bicycle cleat retained by the cleat retaining mechanism from the clipless pedal.

2. The retention and release mechanism in accordance with claim 1, further comprising: the cleat retaining mechanism having two tension springs instead of one tension spring.

3. The retention and release apparatus for use on a clipless bicycle pedal in accordance with claim 1, further comprising: the elongated spar having a bottom surface with a pair of spaced apart support members.

4. A retention and release apparatus for use on a clipless bicycle pedal, the tension and release apparatus comprising:
   a. a cleat retaining mechanism including a clamp head and a spring retainer including a retaining spring providing a spring retaining force to retain a bicycle cleat within the cleat retaining mechanism, the cleat retaining mechanism also including a clip pedal attachment by which the cleat retaining mechanism is affixed to the clip pedal; and
   b. an elongated spar integrally affixed to a rear of the cleat retaining mechanism, the elongated spar extending away from the clamp head by a given distance so that a downward force on the elongated spar will provide a mechanical advantage to overcome the spring retaining force of the retaining spring, and cause the clamp head to move away from the retaining spring and a bicycle cleat retained by the cleat retaining mechanism, thereby releasing the bicycle cleat retained by the cleat retaining mechanism, the elongated spar having an upper surface further comprising a grip on the upper surface.

5. The retention and release apparatus recited in claim 4, further comprising the elongated spar further comprises a plurality of grips.

6. The retention and release apparatus recited in claim 4, further comprising the elongated spar further comprises at least one support member.

7. The retention and release apparatus recited in claim 4, further comprising the pedal attachment is selected from the group consisting of a screw, a bolt, and a pin.

8. The retention and release apparatus recited in claim 4, further comprising the cleat retaining mechanism including a top which has a generally curved appearance, said curved appearance arcs downward towards the heel of a cyclist's foot.

9. The retention and release apparatus recited in claim 8, further comprising said curved appearance is derived from a single curve, a series of angled planar surfaces, or a combination of both curved and planar surfaces.

10. The retention and release apparatus recited in claim 4, further comprising the cleat retainer further comprises a receding surface located immediately above the clamp head thereby allowing the clamp head to retain and release a rear retainer of a cleat adapter without being impeded by any other structures of a cleat adapter.

11. The retention and release apparatus recited in claim 4, further comprising the spring retaining mechanism is further comprised of two springs instead of one spring.

\* \* \* \* \*